(12) United States Patent
Breedlove

(10) Patent No.: US 7,887,738 B2
(45) Date of Patent: Feb. 15, 2011

(54) BRICK AND METHOD FOR ITS MANUFACTURE

(76) Inventor: Marc M. Breedlove, 152 Cargill, Tatum, TX (US) 75691

( * ) Notice: Subject to any disclaimer, the term of this patent is extended or adjusted under 35 U.S.C. 154(b) by 1161 days.

(21) Appl. No.: 10/740,732

(22) Filed: Dec. 19, 2003

(65) Prior Publication Data

US 2005/0144897 A1 Jul. 7, 2005

(51) Int. Cl.
B28B 3/00 (2006.01)
B29C 43/20 (2006.01)

(52) U.S. Cl. .......................... 264/333; 264/73

(58) Field of Classification Search ................. 264/333, 264/73
See application file for complete search history.

(56) References Cited

U.S. PATENT DOCUMENTS

| | | | |
|---|---|---|---|
| 1,727,580 A * | 9/1929 | White | 264/426 |
| 3,670,060 A * | 6/1972 | Cuffaro et al. | 264/77 |
| 3,939,238 A | 2/1976 | Salts | |
| 4,148,662 A | 4/1979 | Hughes et al. | |
| 4,178,340 A | 12/1979 | Hyytinen | |
| 4,229,156 A | 10/1980 | Hyytinen | |
| 4,590,726 A | 5/1986 | Salazar | |
| 4,666,389 A * | 5/1987 | Relis et al. | 425/78 |
| 5,183,616 A | 2/1993 | Hedrick | |
| 5,637,236 A | 6/1997 | Lowe | |
| 5,735,094 A | 4/1998 | Zember | |
| 5,827,015 A * | 10/1998 | Woolford et al. | 405/286 |
| 6,082,933 A | 7/2000 | Maguire et al. | |
| 6,382,947 B1 * | 5/2002 | Bryant | 425/130 |
| 6,440,884 B1 | 8/2002 | Devagnanam | |
| 6,513,293 B2 | 2/2003 | Miller | |
| 2002/0144632 A1 | 10/2002 | Johansen, Jr. et al. | |
| 2003/0198122 A1 * | 10/2003 | Johnson | 366/2 |

OTHER PUBLICATIONS

Symons, A Dayton Superior Company, Integral Color, www.symons.com, 2 pages.
New River Concrete Supply, Long-Lasting Color, http://209.120.157.150, copyright 2000, 2 pages.
Taylor Concrete Products, Inc., Brick and Standard Specification for North Country Brick, copyright 2000. 4 pages.

* cited by examiner

Primary Examiner—Christina Johnson
Assistant Examiner—Patrick Butler
(74) Attorney, Agent, or Firm—Polsinelli Shughart PC

(57) ABSTRACT

Concrete bricks are produced that have a similar appearance to natural or clay brick. Each brick includes internal colors throughout the brick that mimic the flashings in natural or clay brick.

27 Claims, 11 Drawing Sheets

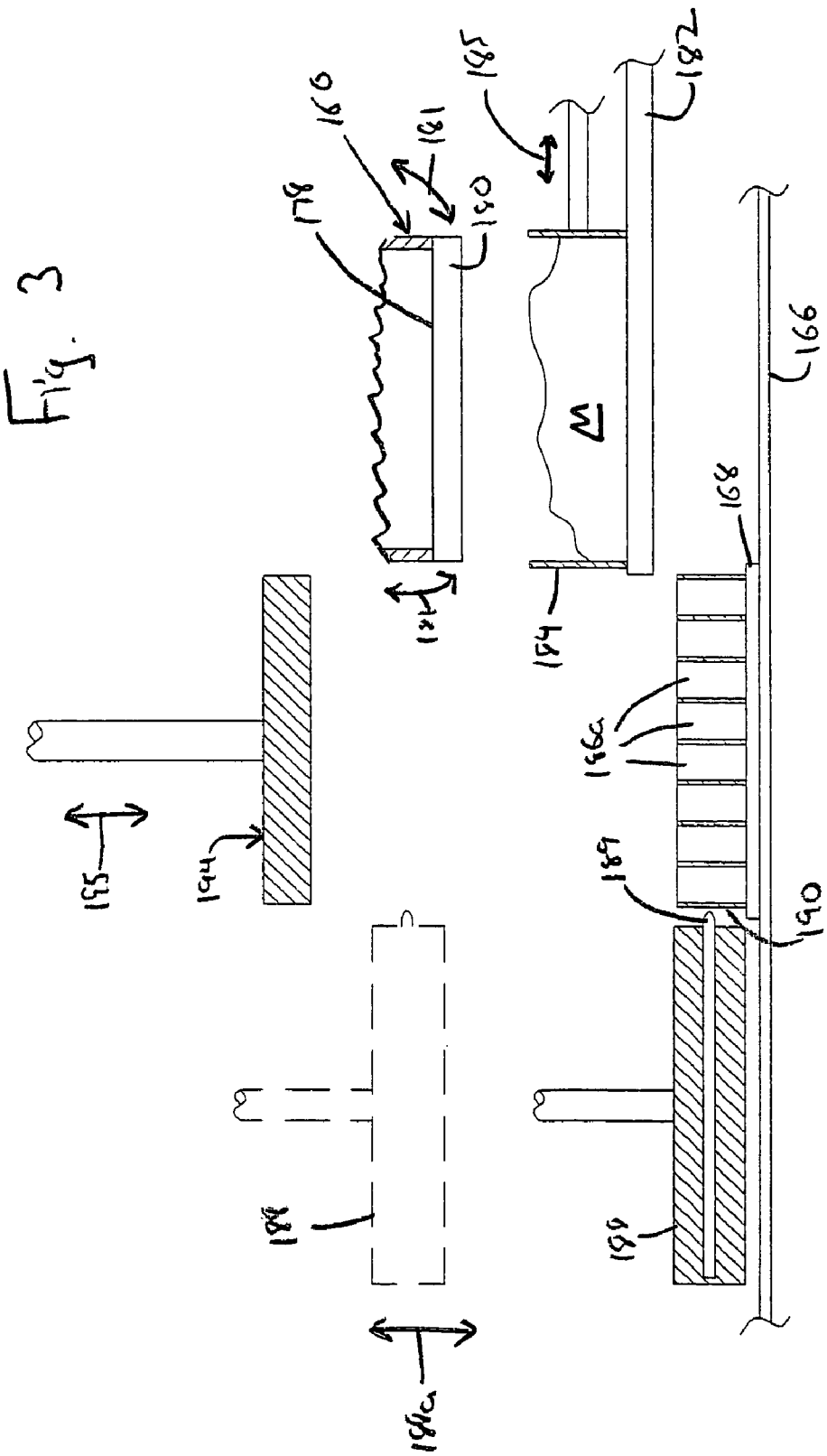

BRICK AND METHOD FOR ITS MANUFACTURE

The application file contains at least one photograph executed in color. Copies of this patent application publication with color photographs will be provided by the Office upon request and payment of the necessary fee.

TECHNICAL FIELD

The present invention is directed to methods for manufacturing bricks, and the resultant brick composition. In particular, the present invention is directed to concrete bricks having an external and internal appearance similar to natural or clay bricks, and methods for manufacturing the bricks.

BACKGROUND

Bricks are a commonly used building material, typically for the exteriors of residential and commercial structures. Brick exteriors are preferred, because a timeless, sturdy, and rich look is incorporated into a building. Additionally, the character is maintained for decades and requires minimal maintenance. Accordingly, for many upper end residential and commercial structures, brick is the preferred material for use in exterior construction. Moreover, many municipalities have building codes that require structures to have a brick exterior. Unfortunately, brick is comparatively more expensive than comparable building materials. There is a resulting need for alternative composition bricks that are comparably less expensive.

Most commercially available bricks for use in house construction are made of clay. This is commonly referred to as "clay" or natural brick, collectively "clay" brick. Clay brick is preferred because it has natural variations of color throughout its main color. This color variation is known as flashing. For example, red brick will have various color flashings, such as black, with the black flashings providing a natural variation of color throughout the brick.

Clay brick tends to be an expensive material because of high manufacturing costs. As a result, alternatives to clay brick are desired. Concrete bricks are a cost effective alternative to clay brick. Contemporary concrete bricks, however, have numerous drawbacks. Concrete bricks typically consist of a painted or colored exterior with an interior of a different color. The paint will not permanently adhere to the brick so that after a period of time it peels and cracks. The underlying color will resultantly contrast the exterior color of the remaining paint on the bricks.

Moreover, painting or coloring the concrete bricks produces a "fake" look. Painting a brick generally does not mimic the variations in tone and color associated with a clay brick. Paint produces a uniform color on the surface. Also, paint imparts a reflective characteristic to the surface. As such, when placed side-by-side, the painted concrete bricks do not duplicate the appearance of clay bricks, and, as such, are not a viable alternative. These colorings, and therefore, the concrete bricks, lack the rich look of a clay brick, and are easily detected by the human eye.

Additionally, contemporary concrete bricks are not suitable for high-end construction. Rather, concrete bricks have been relegated to uses in low-end construction, or for landscaping and walkways. Accordingly, concrete bricks are generally unacceptable to builders or purchasers of "upper-end" construction projects. Concrete, however, is a comparatively inexpensive material. Further, it is durable, as it doesn't readily crack or chip. For these reasons, it is desired to have concrete bricks which are available for residential construction. In particular, it is desired to have a concrete brick that closely mimics the appearance of a clay brick.

SUMMARY

The present invention improves on the contemporary art as it provides concrete bricks and methods for their manufacture that have the appearance of natural or clay bricks, with the strength and thermal properties of clay bricks. The concrete bricks have a similar appearance to natural or clay brick, as each brick includes internal colors throughout the brick that mimic the flashings in the natural or clay brick. Additionally, manufacturing of the concrete bricks is economical, as costs for manufacturing the concrete bricks are substantially less than for manufacturing corresponding clay bricks.

An embodiment of the invention is directed to a method for making at least one concrete brick having an appearance that mimics a natural brick, defined by a matrix with flashings within the matrix. The method includes, providing a funnel shaped hopper in communication with a vibrating mechanism. A first batch of concrete of a first color is provided to the hopper as is a second batch of concrete of a second color. The hopper is vibrated as the first and second batches flow through it by gravity, to form a mixture where the concretes of the first and second batches remain physically separable. At least a portion of the mixture from the hopper is molded into at least one preform brick. Additionally, the first and second batches are typically provided to the hopper in an arrangement where the second batch is on top of or over, and in contact with, the first batch.

Another embodiment is directed to a concrete brick made in accordance with the method (process) described immediately above.

Another embodiment is directed to a method for making at least one concrete brick having an appearance that mimics a natural brick, defined by a matrix with flashings within the matrix. The method includes providing a funnel shaped hopper having a first opening through which material is received and a second opening through which material exits from the hopper, the hopper in communication with a vibrating mechanism. A first batch of concrete of a first color is provided to the hopper. A second batch of concrete of a second color is provided to the hopper on top of and in contact with the first batch. The first batch and the second batch are mixed by causing the first batch and the second batch to collapse inwardly into a central void upon flowing through the hopper, and vibrating the hopper as the first and second batches flow through it. At least a portion of the mixture from the hopper is molded into at least one preform brick.

Another embodiment is directed to a concrete brick made in accordance with the method (process) described immediately above.

Another embodiment is directed to a brick having a concrete body including a matrix of a first color and flashing of at least one second color within the matrix. The first color is typically different than the at least one second color.

Another embodiment is directed to a brick having a concrete body including a matrix of a fist color and a flashing of at least one second color within the matrix, with the concrete body of medium grade sand.

Another embodiment of the invention is directed to a brick premix. This premix includes, a first batch of concrete of a first color, and a second batch of concrete of a second color. The first batch and the second batch are mixed together by the second batch being placed over the first batch; causing the first batch and the second batch to collapse inwardly into a central void upon flowing through a funnel-shaped hopper; and vibrating the hopper as the first and second batches flow through the hopper.

Another embodiment is directed to a brick premix including a first batch of concrete of a first color, and a second batch of concrete of a second color. The first batch and the second batch are mixed together to form a matrix from the first color of the first batch. The second color of the second batch is interspersed within the matrix.

BRIEF DESCRIPTION OF THE DRAWINGS

Attention is now directed to the drawing figures, where corresponding or like components are indicated by corresponding or like reference numerals or characters. In the drawings:

FIG. 3 is a side view of the brick machine of FIG. 1;

DETAILED DESCRIPTION OF THE DRAWINGS

Figure 1:
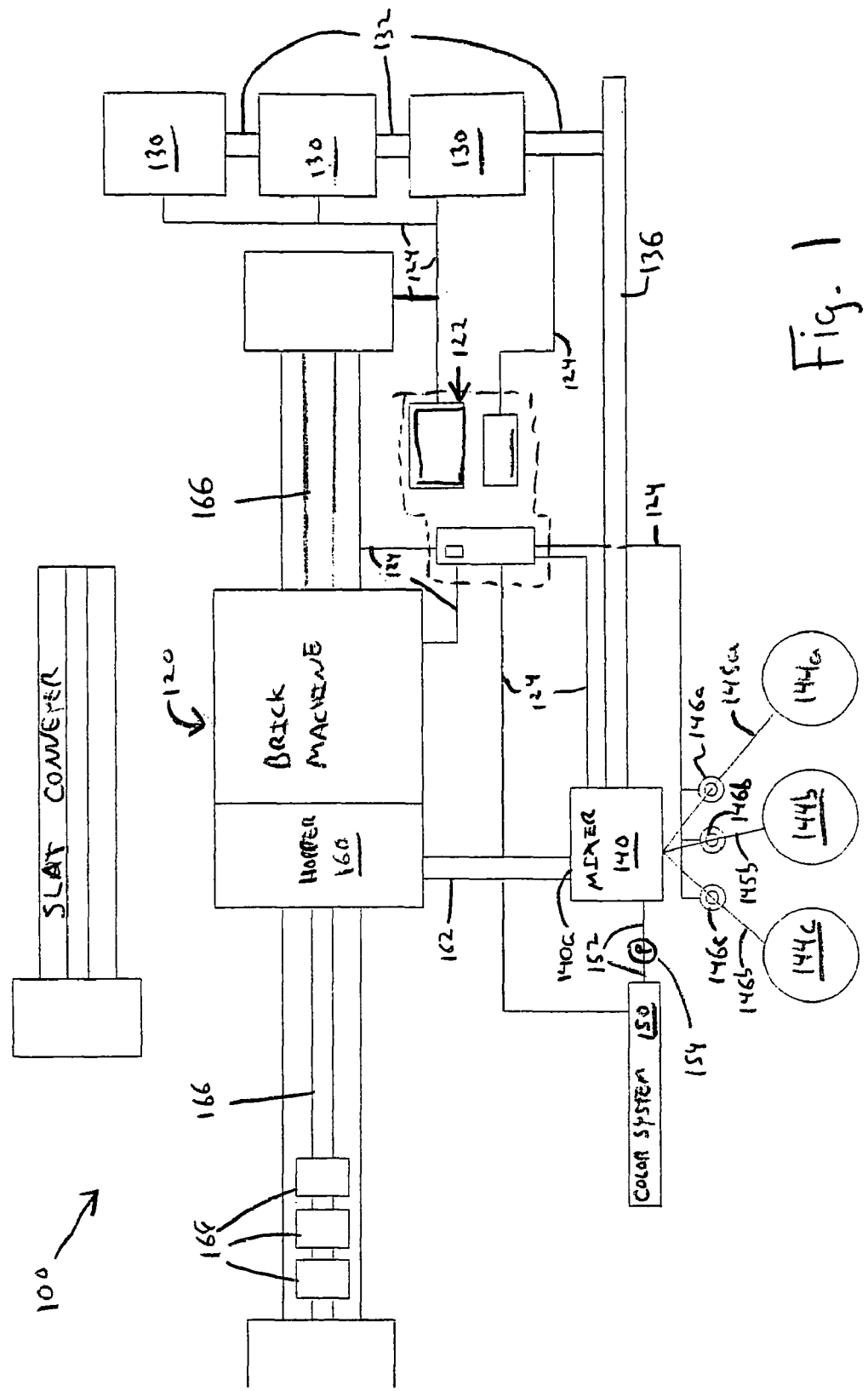
FIG. 1 is a diagram of an exemplary system used to make the bricks of the present invention.
Figure 2A:
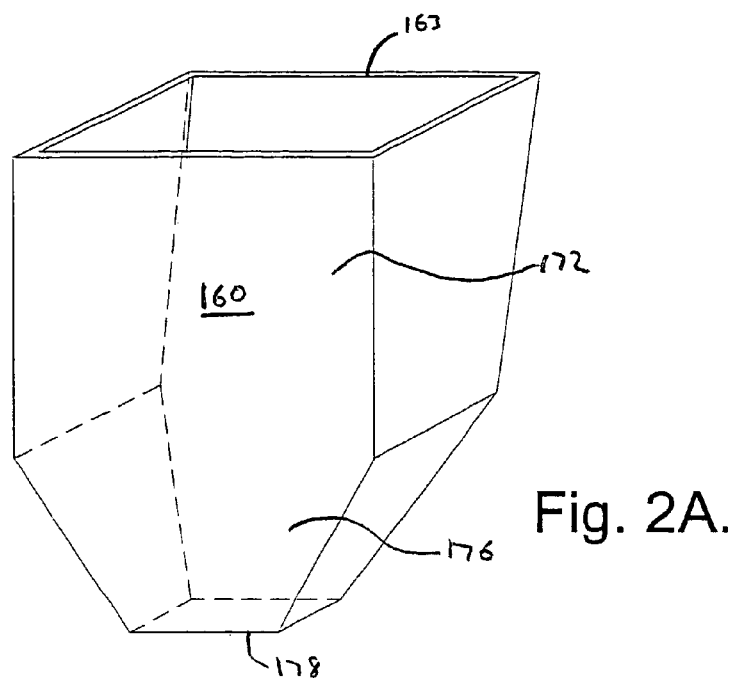
FIG. 2A is a perspective view of the hopper for the brick machine of FIG. 1.
Figure 2C:
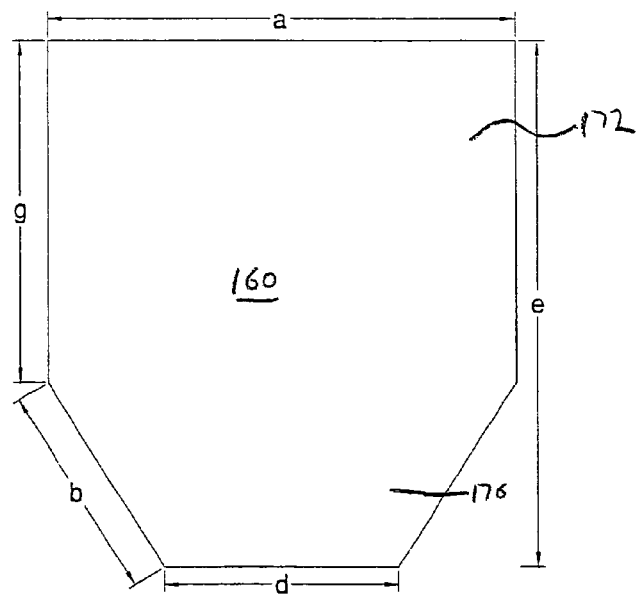
FIG. 2C is a front view of the hopper of the brick machine of FIG. 1
Figure 2B:
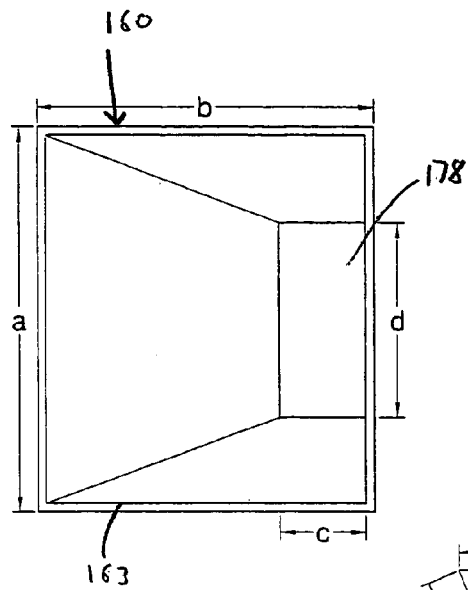
FIG. 2B is top view of the hopper of the brick machine of FIG. 1.
Figure 2D:
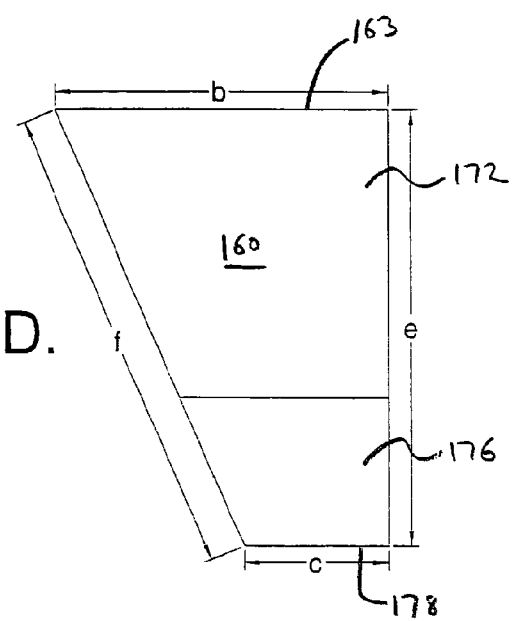
FIG. 2D is a side view of the hopper of the brick machine of FIG. 1

The present invention relates to methods and systems for producing concrete bricks as well as the compositions used to form bricks and the resultant bricks. The concrete bricks are typically of two or more colors, with a first or base color, and at least one other second color. The addition of the second color to the base color provides a flashing appearance throughout the base color of the entire brick, which mimics the appearance of a clay or natural brick.

The descriptions of the processes, methods, systems, and components thereof herein have been made with reference to directions and orientations such as up, down, downward, upward, upper, lower, top, bottom, above, below, etc. These directions and orientations are exemplary to describe the invention as detailed below.

The methods for forming the bricks of the invention are initiated by obtaining concrete compositions for various batches of concrete. Concrete includes any conglomerate of gravel, pebbles, sand, broken stone, and blast-furnace slag or cinders, termed the aggregate, imbedded in a matrix of mortar or cement. The concrete batches are each formed from a concrete mix, with each concrete mix including constituents such as, cement, sand, water, additives, e.g., curing enhancers, moisture repellants, and pigments, if a colored concrete is desired. Typically, two batches of concrete are used to form the bricks. These two batches include a first batch, also known as a base mix, and a second batch, also known as a face mix.

This first batch will typically be the base color for the bricks. The concrete mix that becomes the first batch is typically made (components mixed together) in a mixer, such as that used for forming concrete. A typical first batch is formed by combining the following constituents: cement, sand, water, additives, and pigment. The constituents can be added in any order, however, it is preferred to add the pigment last. The constituents will be mixed until all the constituents are uniformly dispersed.

Cement includes any mixture of fine-ground lime, alumina, and silica that will set to a hard product by admixture of water, which combines chemically with other ingredients to form a hydrate. Suitable cements for use here with the concrete mix include, hydraulic cements, aluminous (high alumina) cements, and Portland cements. An amount of cement is added to the concrete mix equal to between about 3% and about 23% by weight of the concrete mix. The concrete mix more typically has between 10% and 15% by weight cement.

Sand is added to the concrete mix. Any of a variety of sand or similar particulate matter can be used. It is preferred for a medium grade sand to be used. The selected sand should be such that it contributes to the texture and appearance of the brick. Typically, larger grade sands prevent the concrete brick from mimicking the appearance of a clay brick. Sand, includes sediment particulates ranging in size from 1/16 to two millimeters. The sand should be such that at least 80% of the particles pass through a Standard (U.S./English) No. 8 sieve and at least 30% through a Standard (U.S./English) No. 30 sieve. A suitable sand for use here with the concrete mix is washed concrete sand, for example, the sand from a source at Malakoff, Tex., USA. The sand is characterized by the below sieve analysis. In this sieve analysis, the "Sieve Size" refers to standard sieves that are US/English sized. "Amounts" are the percentage of the sand sample that actually passed through each specifically sized sieve. "Specifications" are percentages in desired target ranges of the sand sample that should pass through each specifically sized sieve. The sieve analysis for the preferred is as follows:

| Sieve Size (US/Eng.): | 3/8" | No. 4 | No. 8 | No. 15 | No. 30 | No. 50 | No. 100 | No. 200 |
|---|---|---|---|---|---|---|---|---|
| Amounts: | 100 | 98.8 | 85.1 | 70.4 | 56.4 | 16.5 | 1.5 | 0.5 |
| Specifications: | 100 | 95 to 100 | 80 to 100 | 50 to 85 | 25 to 80 | 5 to 30 | 0 to 10 | ≦1 |

The concrete mix typically contains an amount of sand equal to between about 70% and about 93% by weight of the concrete mix. The concrete mix more typically has sand added in an amount ranging between 80% and 85% by weight of the concrete mix.

The sand and cement (prior to curing) are mixed to produce the concrete. The sand functions as a filler in the cement, to reduce cracking and shrinkage. Additionally, the fineness of the sand will determine the texture of the resultant brick. As long as the desired finished texture in the resultant brick is accomplished, any of a variety of fillers may be used. Additionally, sand other than that described herein can also be used.

Water is included in the concrete mix. The concrete mix typically contains an amount of water equal to between about 1% and about 14% by weight of the concrete mix. The concrete mix more typically has an amount of water equal to between 3% and 5% by weight of the concrete mix. The water is typically added to the concrete mix from an external source, but alternatively, could be indigenous to the sand (for example, if wet sand is added to the concrete mix). An amount of water should be included sufficient to wet the cement so it can be uniformly set.

Additives can be included in the concrete mix. For example, trace amounts of a curing enhancer and moisture repellant equal to less than 1% by weight of the concrete mix can be added.

To the concrete mix, an amount of pigments is added. Pigments include substances, usually in the form of a liquid, that impart color to another substance or mixture. Liquid pigments are used to impart color to the concrete compositions to which they are added. Alternately, dry powder pigments can also be used with the concrete compositions described herein. Any of a variety of pigments can be used. Preferred colors for these pigments include those that are similar to the naturally occurring colors in clay. The pigment(s) is added in an amount sufficient to color the concrete to the desired level. For example, amounts of liquid pigment or pigments equal to less than 1% by weight of the concrete mix can be added, with such amounts sufficient to color the concrete. Typical pigments used to make the bricks of the invention are those that result in low reflectivity. For example, these pigments may be provided by Solomon Colors, Springfield, Ill. These pigments are typically added to the concrete after its initial formation, but prior to curing.

The aforementioned components of the concrete mix are mixed together to form the first batch. Mixing is typically performed in a standard concrete mixer, for example, a Pan mixer, Model No. HPGM 750, from Kabag Wiggert & Co., Karlsruhe, Germany, with a 1725 RPM motor. All components are placed into this mixer and mixed for at least approximately 45 seconds (this mixing is at a speed of at least approximately 600 RPM), so as to have complete mixing of all components. While the pigments are typically added after all other components have been mixed into the concrete mix, pigments can also be added contemporaneously with all of the aforementioned components that form the concrete mix, and mixed with these components, to form the concrete mix.

After mixing, the first batch (base mix) of concrete is loaded into a holding unit. The first batch remains in this holding unit until needed.

A second concrete batch (face mix), of a second color, typically a different and contrasting color to the color of the first concrete batch, that will be the flashing color, is then made. This second concrete batch is typically made in a manner similar or identical to that for the first batch, as detailed for the concrete mix (for the first batch) above. Once all components of the face mix are mixed together, in the aforementioned pan mixer as detailed above, the second concrete batch is complete. The second concrete batch can be made simultaneous with or before the first concrete batch. The second concrete batch is loaded into the holding unit, typically into physical contact the first concrete batch and on top of, or over, the first concrete batch, to create an "overbatching" arrangement in the holding unit.

The holding unit is typically a funnel-shaped structure. By "funnel-shaped," it is meant that a structure has a conical shape, for example, circular, rectangular or the like, with a wide opening and a narrow opening at its ends, with at least a portion of the structure tapering inward from the wide opening to the narrow opening, the narrow opening fitting within and bounded by the wide opening. Suitable funnel-shaped holding units are such that material enters the wide opening and exits through the narrow opening, with the wide opening typically located above the narrow opening.

This funnel shape subjects the materials in the holding unit to the "funnel effect," as the downward movement of the materials (with gravity) in the holding unit causes the materials to collapse inward and form a central void, with a downwardly moving vortex. This central void and vortex form as the first and second concrete batches, acting as a single ball of material, collapse inward toward the center in the holding unit. This funnel effect causes mixing of the first and second concrete batches, sufficient to combine them as the batches (and accordingly, the colors) intersperse, but remain physically separable and distinct. The holding unit can be any funnel-shape, for example, frustro-conical, or can be any other device of a variety of shapes sizes and dimensions, as long as the first and second concrete batches are adequately combined to achieve the aforementioned mixing.

The holding unit, which causes the aforementioned mixing, is vibrated. These vibrations are sufficient to enhance the funnel effect and therefore, mixing, of the first and second concrete batches, such that these batches intersperse, but remain physically separable and distinct. The holding unit is typically subjected to vibration by one or more motors on the machine that support the holding unit. These motors are typically adjustable to variable speeds up to approximately 2800-3200 RPM. The motor(s) is/are, for example, set at speeds of at least approximately 1500 RPM, with a typical motor set to a speed of approximately 3000 RPM.

The vibrations on the holding unit typically enhance the "funnel effect", as the batches flow downward (with gravity) toward the bottom opening of the holding unit. This bottom opening is unobstructed when a door, that typically closes and obstructs the bottom opening, is moved beyond the opening. This allows completion of the "funnel effect," the mixture of the first and second concrete batches moves through the holding unit, and outside of it.

A typical holding unit includes a top opening that tapers inward to a bottom opening. The bottom opening is of lesser area (smaller size) than the top opening. Additionally, the bottom opening is typically bounded within the top opening.

The term mixture, as defined herein, is a heterogeneous association of substances which can not be represented by a formula. The batches, and in particular, the colors of the mixture, remain physically and chemically distinct, and as such, these colors do not blend into a single or hybrid color. Moreover, this mixture is such that the batches can typically be physically separated by mechanical means.

The material (mixture of the concrete of the first and second batches), upon leaving the holding unit is placed into a mold. The mold is typically divided into units corresponding to the desired brick dimensions. The mold is typically vibrated, for example, at speeds similar to those for the holding unit, as a single vibrator motor (detailed above) is typically used to create the vibrations. Vibrating the mold allows for material to evenly fill the units as well as to continue the mixing of the colors from the batches.

The method for forming the bricks is part of a continuous process. The amount of material produced is dependent upon the desired amount of bricks to be produced. As such, any of a variety of concrete batch amounts can be used.

With the mold filled, the mold is stamped to compress and consolidate the material in the units of the mold. During this stamping (pressure application), the mold can continue to be vibrated, for example, at speeds similar to those for the holding unit, as a single vibrator motor (detailed above) is typically used to create the vibrations. The vibrations enhance the stamping process as well as continuing the mixing of the colors, without the colors blending.

The mold is then removed, releasing preform bricks. The preform bricks are of a base color or matrix, corresponding to the color of the first batch, with flashings of the second color from the second batch, interspersed throughout the matrix.

The preform bricks are typically further processed. For example, the preform bricks can be loaded into a steam kiln, in order to cure with heat and moisture from the steam. This additional processing to the final product does not result in any appearance or color changes by the brick. The completed and cured bricks are now ready for various uses and can now be packed for shipment.

The now cured or resultant bricks are similar to the preform bricks in that they are of the same base color or matrix, corresponding to the color of the first batch, with flashings of the second color from the second batch, interspersed throughout the matrix. The base color with flashings interspersed therein provides each resultant brick with a consistent appearance throughout the entire brick (both internally and externally), that is similar to that of clay or natural brick.

Alternately, concrete bricks with multiple color flashings, these flashings typically of colors that are in contrast to the color of the first batch, can be produced in accordance with the present invention. When multiple color flashings are desired, subsequent batches of concrete (in addition to the first batch or base mix and second batch or face mix), of different colors for flashings, can be made similar to that of the first and second batches detailed above. Each subsequent batch (also a face mix, like the second batch) is loaded into the holding unit, on top of the batch that preceded it, and into contact with the previously loaded batch.

Once all batches have been loaded into the holding unit, the holding unit is vibrated. Contemporaneous, and typically simultaneously with the vibration, the batches move with gravity through the holding unit, undergoing the "funnel effect" and mix, as detailed above. The mixture of the batches is released from the holding unit, and transferred to a mold, as detailed above. Processing continues as detailed above, and then the mold is removed, releasing preform bricks. The preform bricks are of a base color or matrix, corresponding to the color of the first batch, with flashings of the second and subsequent colors from the second and subsequent batches, interspersed throughout the matrix.

The preform bricks are then additionally processed or post processed, typically by being steam cured, as detailed above.

The now cured or resultant bricks are similar to the preform bricks, as detailed above, but the flashings, that are interspersed throughout the matrix (the matrix is the color of the first batch), are of the colors of the second and subsequent batches.

Turning to FIG. 1, there is shown an exemplary system 100 for manufacturing bricks in accordance with the present invention. The system 100 includes a brick machine 120 in which the bricks are made. This brick machine 120 can be, for example, a Model 820AZ Machine from Zenith Maschinenfabrik GmbH, Germany. The system 100, including the brick machine 120 and all other components listed and shown herein are typically under control of the computer 122 (as well as other related hardware, for example, processors, and/or software). All components of the system 100 can be linked to the computer 122 by wired 124 and/or wireless links.

The system 100 includes one or more sand hoppers 130 that empty onto a first conveyer belt 132. The sand hoppers 130 feed into mini-hoppers (not shown) that under the control of the computer 122, provide exact amounts of sand to the conveyer belt 132.

A second conveyer belt 136 is in alignment with this first conveyer belt 132, on which sand is transported to a mixer 140. The mixer 140 is typically a pan mixer or a ribbon blade mixer. The pan mixer is available, for example, as a Model HPGM 750, from Kabag Wiggert & Company of Karlsruhe, Germany. The mixer 140 is typically connected to a water source (not shown).

Silos 144a-144c, for example, three as shown here, provide cement, typically in various colors, to be fed to the mixer 140 over lines 145a-145c. For example, in a typical run, the silos 144a-144c may hold white cement 144a, hydrated limestone 144b and gray cement 144c. The contents from each silo 144a-144c are typically pulled by a vacuum pump 146a-146c, that are positioned along the respective lines 145a-145c, and pump the requisite material into the mixer 140. Each vacuum pump 146a-146c is under computer 122 control, such that the desired material in the desired amount reaches the mixer 140.

A color system 150 connects to the mixer 140 over one or more lines 152. A pump (P) 154 typically sits along the line(s) 152 to move colors from the color system 150 to the mixer 140. The color system 150 typically includes tanks (not shown) for holding various liquid concrete colorants, pigments, or coloring agents. The tanks are typically valved at their ends with the valves (not shown) in cooperative operation with the pump 154. Both the valves and the pump 154 are under the control of the computer 122, such that the precise amount of color reaches the mixer 140.

The brick machine 120 includes a hopper 160, that receives material from the mixer 140 by a third conveyer belt 162. This second conveyer belt 162 is typically angled upward, toward the hopper 160, as the hopper opening 163 is typically at a level above the exit port 140a of the mixer 140. A fourth conveyer belt 166, that carries production pallets 168, runs under the brick machine 120.

Turning also to FIGS. 2A-2D, the hopper 160 includes a first opening 163 and upper or bin portion 172. This upper portion 172 tapers inward and downward to a lower portion 176. This lower portion 176 also tapers inward and downward to a second or lower opening 178. This lower opening 178 is narrower than the first opening 163 and typically of an area less than that of the first opening 163. This lower opening 178 is such that it can fit inside of this first opening 163. This arrangement causes the "funnel effect" for the material, as it flows downward in the hopper 160.

The brick machine 120 includes four motors (not shown) that when active, vibrate the hopper 160, as well as all other components of the machine 120, for example, the mold 186 and tamper head 194 (both detailed below). The motors are, for example, variable speed motors that can be set at up to 2800-3200 RPM. The motors of the brick machine 120 are typically under the computer 122 control.

Figure 4:
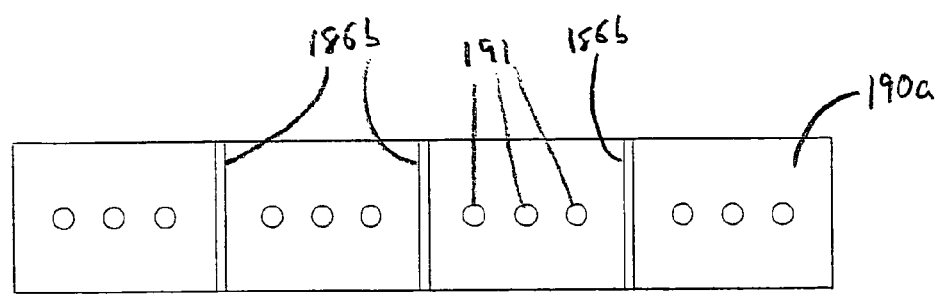
FIG. 4 is a front view of the mold through which the core bars are inserted.
Figure 5:
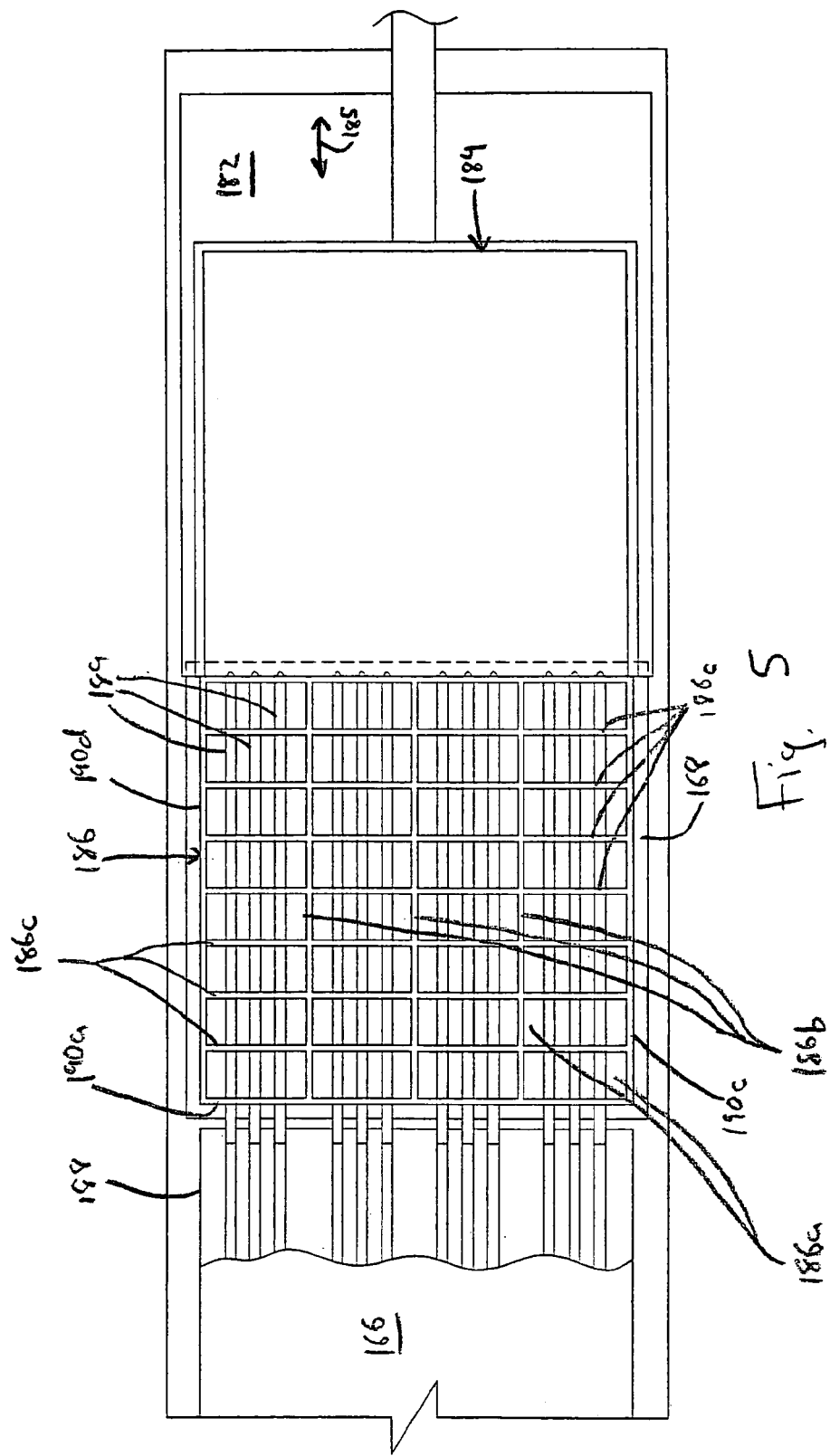
FIG. 5 is a top view of FIG. 3, with the material removed from the feeder drawer and core bars inserted into the mold.

Turning to FIGS. 3-5, the brick machine 120 is such that the hopper 160, at its lower portion 176, terminates at a moveable door 180 (movable in accordance with the double-headed arrow 181). The central lower portion 176 aligns with a table 182 and feeder drawer 184 (movable in accordance with the double-headed arrow 185).

The feeder drawer 184 is closed along four sides and is open at its bottom. A sensor (not shown), connected to the computer 122, sits in the feeder drawer 184. This sensor monitors the volume of material M released into the feeder drawer 184, such that when the desired material volume has filled the feeder drawer 184, the sensor signals the computer 122, that causes the door 180 to close.

The feeder drawer 184 then moves material M off of the table 182 and into a mold 186, that sits on a production pallet 168. The brick machine 120 includes a mechanism 188 (moveable vertically in the direction of the double-headed arrow 188a) that inserts and retracts core bars 189 into the mold 186, at a side 190a thereof, through correspondingly shaped openings 191 (as shown in FIG. 4). This mechanism 188 moves to a position just above the level of the conveyer belt 166, proximate to the side 190a of the mold 186.

The mold 186 is formed of sidewalls 190a-190d, and is typically divided into units 186a, by perpendicularly oriented walls 186b, 186c. Walls 186c also include openings (not shown) that are aligned with openings 191 in the side wall 190a in order to accommodate the core bars 189 as they extend into the mold 186, as shown in FIG. 5. Each unit 186a corresponds to the desired dimensions for a brick 196 (FIGS. 9 and 10) to be produced. For example, one set of dimensions for a standard brick is a face area of 2⅝ inches×9⅝ inches with a depth of 3 inches. The mold 186 is part of the brick machine 120 and is vibrated by the motor (detailed above) through an apparatus (not shown) that raises and lowers it (at its lateral sides-along walls 190c and 190d).

The conveyer belt 166, door 180, feeder drawer 184, and mold 186 are typically controlled by the computer 122. Their actions are coordinated, as detailed below.

A tamper head 194 (moveable in the direction of the double-headed arrow 195) is in alignment with the location at which the mold 186 is filled. This tamper head 194 is movable vertically, and when placed into contact with the mold 186, compresses the material therein at pressures sufficient to consolidate the material, forming the respective bricks. The tamper head 194 can also be vibrated, and is under control of the computer 122, such that its actions are coordinated with the production method, detailed below.

An exemplary process for making concrete bricks will now be described with reference to FIGS. 1-9. Initially, sand, for example, approximately 1800 pounds, from one or more of the sand hoppers 130 is loaded on the conveyer belt 132, and transported to the mixer 140 over the second conveyer belt 136. The requisite cement from the silo(s) 144a-144c, for example, approximately 275 pounds along with approximately 80 pounds of water is placed into the mixer 140. Additives, for example, approximately ¾ pounds of curing enhancer and moisture repellent, are then added to the mixer 140 and these components are mixed together. Colors, for example, approximately 7-12 pounds of liquid pigment from the color system 150, are placed into the mixer 140 and mixed with the now mixed components. Alternately, the pigment can be mixed with the all of the other components if desired. This resultant concrete mix is the first batch (base mix), that will typically be the base color for the brick. This first batch is then placed on the conveyer belt 162 and delivered into the hopper 160.

A second batch (face mix) of material, typically of a second color, different from the first color, that will serve for the flashings in the brick, is then produced in a manner similar to the first batch. It is then loaded into the hopper 160, in the same manner as the first batch, so as to be on top of and in contact with the first batch. Subsequent batches, whose colors typically form additional flashings in the brick, can be produced and added to the hopper 160 in accordance with the second batch detailed above.

With all batches in the hopper 160, the hopper is vibrated continuously. This continuous vibration results from the motors set to, for example, 3000 RPM. The vibrations on the hopper 160 allow for mixing of the batches and movement of the batches in and through the hopper 160, without the batches blending together. As a result, the batches, and therefore, their respective colors, remain physically separable.

Returning to FIG. 3, the hopper door 180 is then opened and material M flows downward by gravity onto the table 182, within the confines of the feeder drawer 184. Upon traveling through the hopper 160 and in particular, downward with gravity through it, the material M undergoes a "funnel" effect (as detailed above), as a central void forms in the material as it collapses inward, with a vortex that moves (flows) downward (with gravity) prior to the material on the sides moving downward. This funnel effect promotes further mixing of the batches, and therefore, the colors, without blending, where the colors remain physically separable.

The vibration period and funnel effect are typically contemporaneous in time. Typically, they occur simultaneously.

The hopper door 180 then closes, and once closed, the feeder drawer 184, pushes the material M off of the table 182 and into the mold 186, that has been placed onto a production pallet 168 moved into position by the conveyer belt 166.

Once the mold 186 has been positioned, and prior to the mold 186 receiving material, a core bar mechanism 188 moves downward (in accordance with arrow 188a) and into alignment with the mold 186. As shown in FIG. 5, core bars 189, for example twelve, typically in 32 units 186a of 4×8, are extended into the mold 186, through the walls 190a and 186c, until they reach the far wall 190b (opposite wall 190a) (that typically includes openings like those in the wall 190a for receiving the tips of the core bars 189, but can also be closed). The core bars 189 will remain in the mold 186, whereby the resultant bricks 196 (FIGS. 9 and 10), here, for example, have three bores extending therethrough. These bores serve to hold mortar when the bricks are laid.

Figure 6:
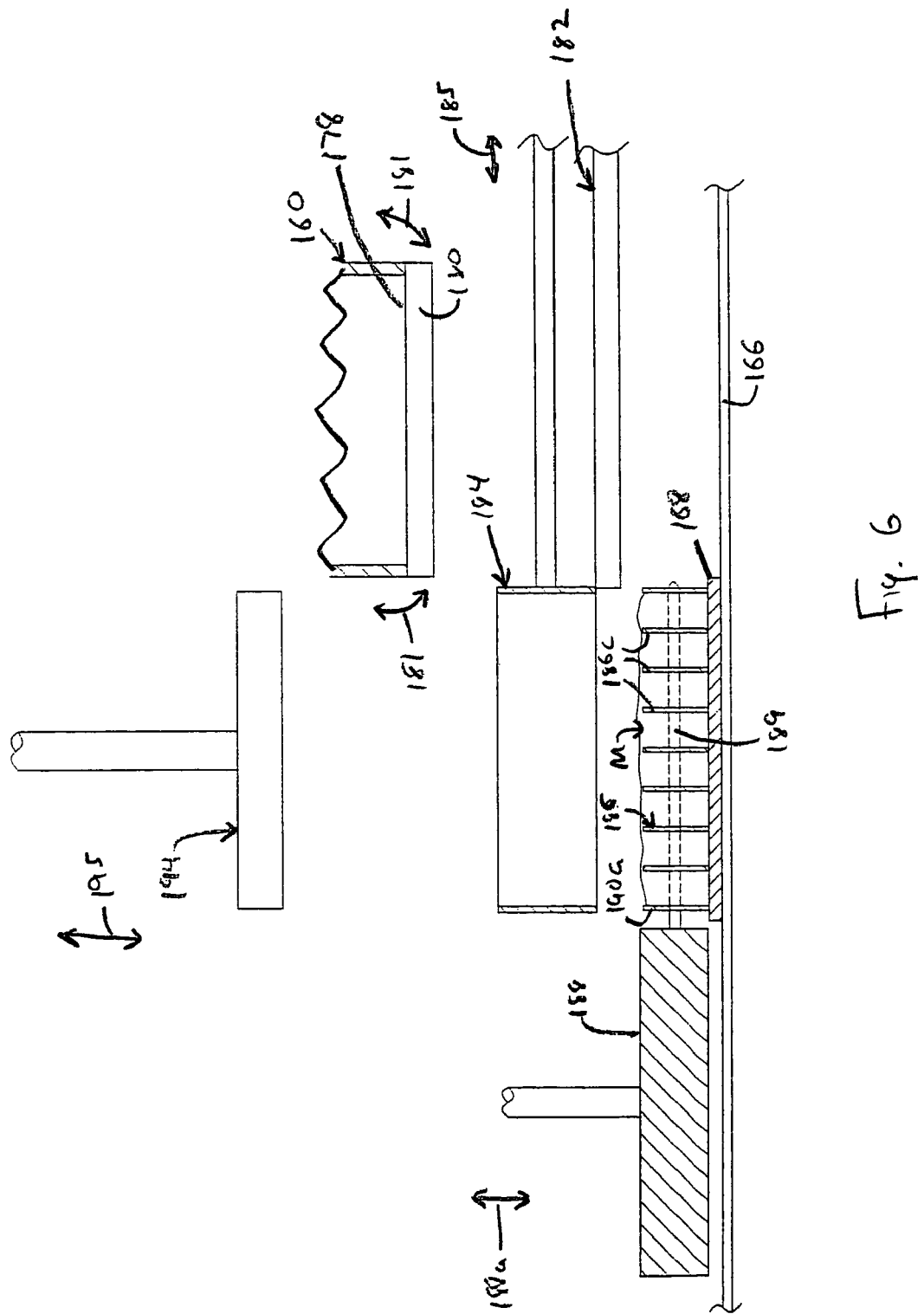
FIG. 6 is a side view of the brick machine of FIG. 1 after material has been deposited in the mold.

Once this extension is complete, the material M is moved into the mold 186 by the feeder drawer 184, as shown in FIG. 6. The mold 186 typically vibrates continuously. This continuous vibration allows the material 179 to properly fill each unit 186a as well as continue the mixing of the colors.

Figure 7:
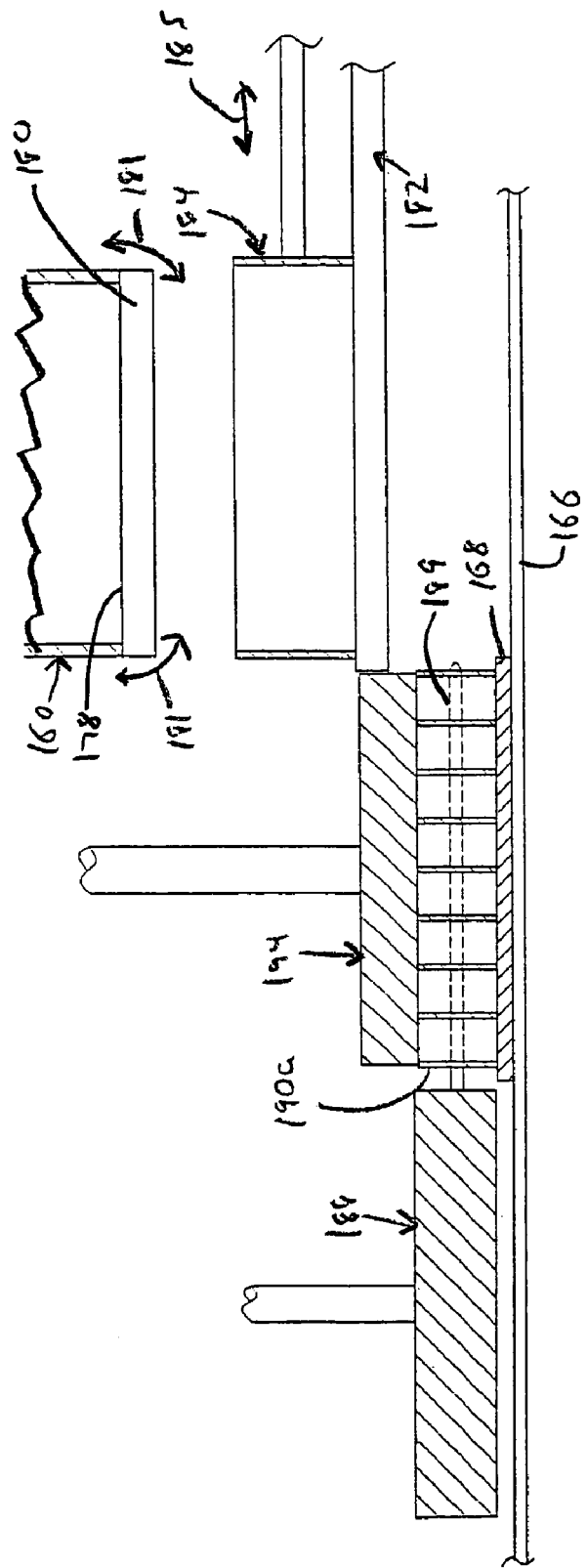
FIG. 7 is a side view of the stamping process for the brick machine.

In FIG. 7, the tamper head 194 comes into contact with the mold 186. Stamping of the material 179 in each unit 186a of the mold 186 is typically at pressures of approximately 20,000 psi to approximately 50,000 psi, and, for example, approximately 35,000 psi, for approximately 1 to approximately 5 seconds, for example, approximately 4 seconds. Stamping at these pressures for this time period allows the material M in the mold 186 to compress so as to form a preform 196 of a brick.

This stamping by the tamper head 194, typically also occurs with the mold 186 and tamper head 194 being vibrated. The vibration period for the mold 186 and tamper head 194 is typically the time of stamping, or for a time period contemporaneous with the stamping. For example, this vibration period could be approximately 4 seconds, to correspond with the time of stamping.

Figure 8:
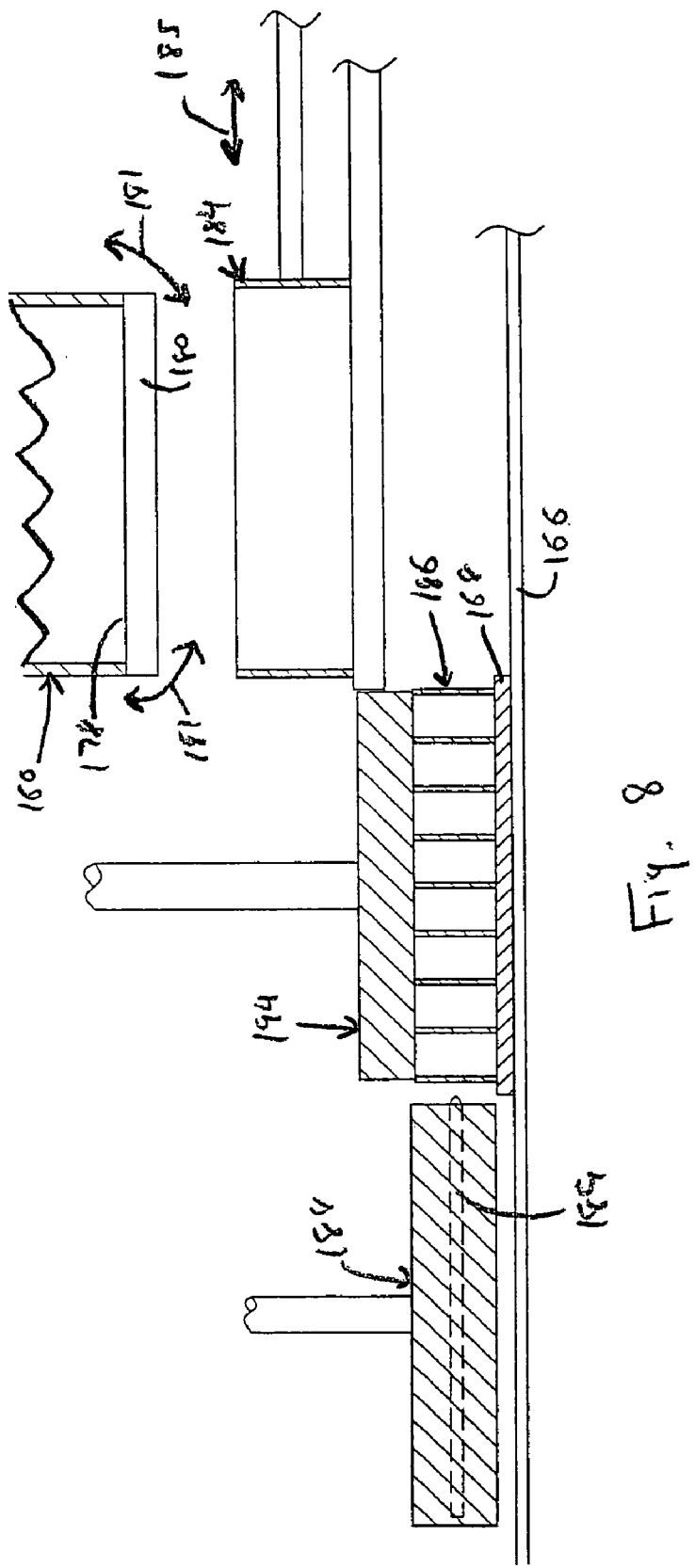
FIG. 8 is a side view detailing the release of the core bars from the mold.
Figure 9:
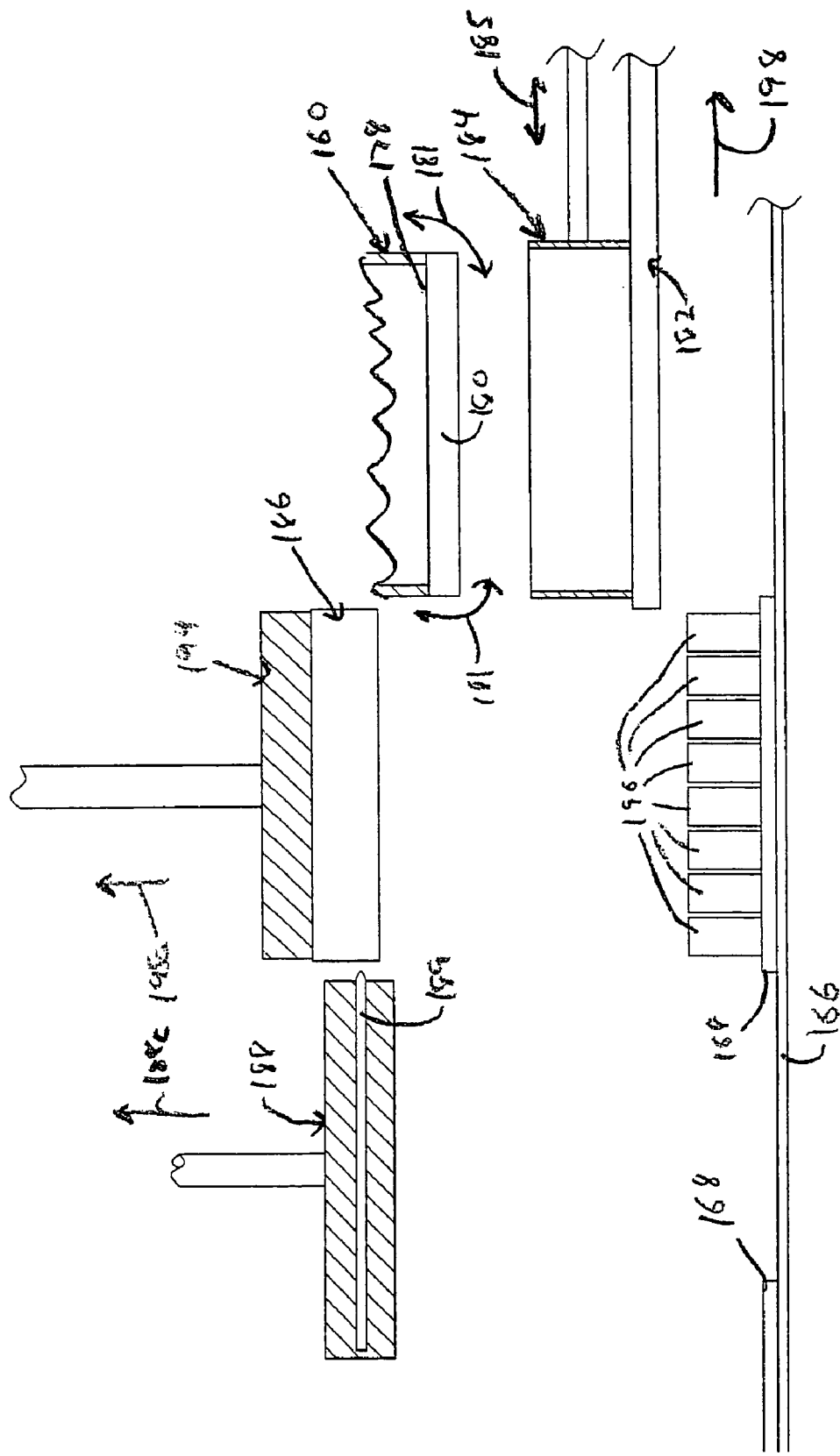
FIG. 9 is a side view detailing release of the tamper head and mold in the brick machine.

Just prior to the tamper head 194 being lifted out of contact with the mold 186, the core bars 189 are retracted, and the core bar mechanism 188 is moved upward, as shown in FIG. 8. Turning to FIG. 9, the tamper head 194 and mold 186 are then lifted upward (in the direction of the arrows 195a, 188c), and the preform bricks 196 (typically arranged eight bricks by four bricks), on the production pallet 168 are moved (advanced on the conveyer belt 166) in the direction of the arrow 198. These preform bricks 196 are now suitable for further processing.

A new production pallet 168 is then moved proximate the table 182, a mold 186 is positioned over the pallet 168, and the hopper door 180 is again opened. The process, as described above, is repeated.

Figure 10:
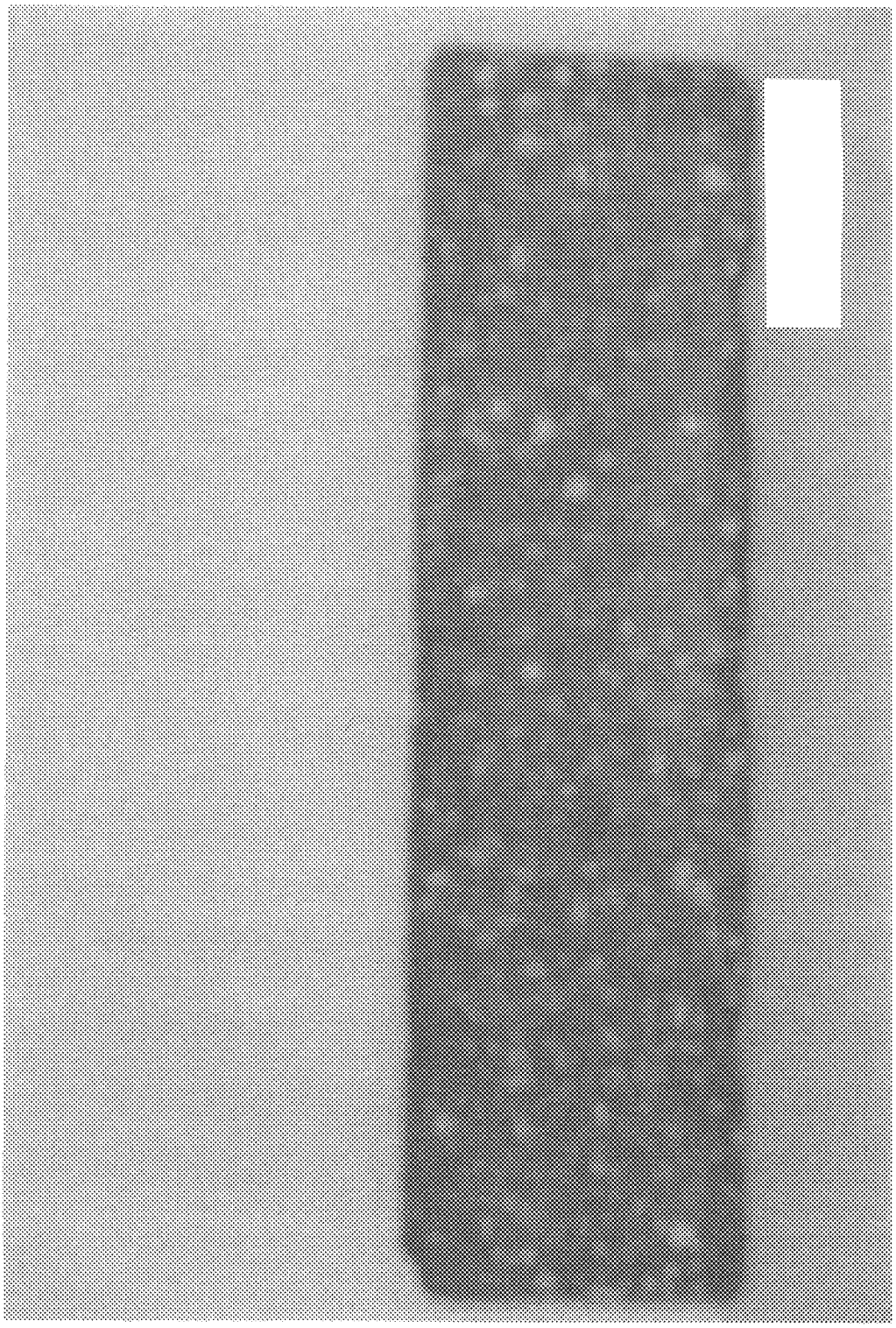
FIG. 10 is a photograph of a brick cross section made in accordance with the process of the present invention.

Further processing of the preform bricks 196, typically includes curing the bricks in a steam kiln. While on the production pallets 168, the bricks 196 are moved to a steam kiln. Curing in this steam kiln includes, for example, a first precure, where the bricks are subjected to steam at approximately 135 degrees Fahrenheit for approximately two hours, followed a cure for approximately four hours in steam at approximately 145 degrees Fahrenheit. This additional processing to the brick does not result in any appearance or color changes by the brick. The completed (finished or resultant) and cured bricks, shown in FIG. 10, are now ready for various uses and can now be packed for shipment.

Examples of processes in accordance with embodiments of the present invention are provided below.

EXAMPLES

In all of the examples, the sand used was washed concrete sand from a source at Malakoff, Tex., USA. A sieve analysis was performed on this sand, by analyzing a sample of this sand. In this sieve analysis, the "Sieve Size" refers to standard sieves that are US/English sized. "Amounts" are the percentage of the sand sample that actually passed through each specifically sized sieve. "Specifications" are percentages in desired target ranges of the sand sample that should pass through each specifically sized sieve. The sieve analysis for the sand sample is as follows:

| Sieve Size (US/Eng.): | 3/8" | No. 4 | No. 8 | No. 15 | No. 30 | No. 50 | No. 100 | No. 200 |
|---|---|---|---|---|---|---|---|---|
| Amounts: | 100 | 98.8 | 85.1 | 70.4 | 56.4 | 16.5 | 1.5 | 0.5 |
| Specifications: | 100 | 95 to 100 | 80 to 100 | 50 to 85 | 25 to 80 | 5 to 30 | 0 to 10 | $\leq 1$ |

The sand was also tested in accordance with Procedures ASTM C-136, TEX 101E (Part 1 A & B).

The cement used in all of the examples below is either a Gray Portland or White Portland Cement, Product No.-Type 1, available from Texas-Lehigh Cement Company, Buda, Tex. 78619.

These examples include various processes for manufacturing bricks, for example, concrete bricks with appearances similar to that of natural or clay brick. These examples are not limiting of the invention and are as follows.

Example 1

In this example, the bricks were formed in a brick machine, Model 820 AZ from Zenith Machinenfabrik GmbH, Germany having four variable speed motors adjustable to speeds of approximately 2800-3200 RPM. The activation of these motors causes components of the brick machine to vibrate.

The method of formation of the bricks was initiated as two batches of concrete were produced.

The first batch (base mix) of concrete was formed as 1800 pounds of sand was mixed with 275 pounds of Gray Portland Cement, 12 ounces of a curing enhancer and moisture repellant (labeled Admix #1217 from Rheapol Master Builders), and 80 pounds of water were mixed in a pan mixer, Model No. HPGM 750, from Kabag Wiggert & Co, Karlsruhe, Germany, for 45 seconds. This mixing produced an initial concrete mixture.

Pigment, 7 pounds of liquid Red Color (#413 Red Color from Solomon Colors, Springfield, Ill. 62791), was added to the initial concrete mixture in the pan mixer, where mixing resumed for 45 seconds. The color of the pigment blended into the concrete to form a now mixed first batch of colored concrete. This first batch of colored concrete or first batch was transferred to a hopper of the Model 820 AZ Brick Machine. This hopper is in accordance with FIGS. 2A-2E, and had dimensions as follows: a=63 inches, b=55 inches, c=12 inches, d=39 inches, e=67 inches, f=76 inches, g=42 inches, h=30 inches.

The second batch (face mix) of concrete was formed as 1800 pounds of sand was mixed with 275 pounds of Gray Portland Cement, 12 ounces of a curing enhancer and moisture repellant (labeled Admix #1217 from Rheapol Master Builders), and 80 pounds of water were mixed in the aforementioned pan mixer for 45 seconds. This mixing produced a concrete mixture, that was transferred to the aforementioned hopper to be on top of and in contact with the first concrete batch.

In the hopper, the bottom opening is opened and the hopper is vibrated continuously by the motors, each set to a speed of 3000 RPM. This speed was sufficient to cause the first and second batches to mix (whereby the batches and colors of these batches remained physically separable). Material was released from the hopper until a volume of 7.88 cubic feet of material was released. A 32-unit mold was filled, each unit to accommodate brick dimensions of 2⅝ inches×9⅝ inches×3 inches. The mold was continuously vibrated during and after filling, as a result of the motors, each set at a speed of 3000 RPM.

With the mold filled, a tamper head was pressed into contact with the material in each of the units of the mold. The tamper head pressed the material in the mold at 35,000 pounds for 4 seconds, and during this time, the mold was vibrated by the motors, each set to a speed of 3000 RPM. The mold was then released, yielding 32 preform bricks. The resultant preform bricks were of a red matrix with grey flashings, throughout the entire body of the brick. This process of filling the mold was repeated for twelve cycles, resulting in 384 bricks.

The preform bricks were then placed into a steam kiln. In this steam kiln, the preform bricks underwent a first cure in steam, at 135 degrees Fahrenheit for two hours, and a second cure in steam at 145 degrees Fahrenheit for four hours. The now formed or resultant bricks were removed from the steam kiln.

The coloration of the bricks remained identical to that of the preform bricks, as detailed immediately above.

Example 2

In this example, the bricks were formed in the brick machine of Example 1.

The method of formation of the bricks was initiated as two batches of concrete were produced.

The first batch (base mix) of concrete was formed as 1800 pounds of sand was mixed with 275 pounds of Gray Portland Cement, 12 ounces of a curing enhancer and moisture repellant (labeled Admix #1217 from Rheapol Master Builders), and 80 pounds of water were mixed in a pan mixer as detailed in Example 1 above, for 45 seconds.

Pigment, 6 pounds of liquid Yellow Color (#115 Yellow Color from Solomon Colors, Springfield, Ill. 62791) and 8 pounds of liquid Red Color (#413 Red Color from Solomon Colors, Springfield, Ill. 62791), was added to the initial concrete mixture in the pan mixer, where mixing resumed for 45 seconds. The color of the pigment blended into the concrete to form a now mixed first batch of colored concrete. This first batch of colored concrete was transferred to a hopper, as detailed in Example 1 above.

The second batch (face mix) of concrete was formed as 1800 pounds of sand was mixed with 275 pounds of Gray Portland Cement, 12 ounces of a curing enhancer and moisture repellant (labeled Admix #1217 from Rheapol Master Builders), and 80 pounds of water were mixed in the pan mixer, as detailed in Example 1 above, for 45 seconds. This now mixed second concrete batch was transferred to the hopper, where it was on top of and in contact with the first concrete batch.

In the hopper, the bottom opening is opened and the hopper is continuously vibrated by the motors, each set to a speed of 3000 RPM. This speed was sufficient to cause the first and second batches to mix. Material was released from the hopper until a volume of 7.88 cubic feet of material was released. A 32-unit mold was filled, each unit to accommodate brick dimensions of 2⅝ inches×9⅝ inches×3 inches. The mold was vibrated continuously by the motors, each set to a speed of 3000 RPM.

With the mold filled, a tamper head was pressed into contact with the material in each of the units of the mold. The tamper head pressed the material in the mold at 35,000 pounds for 4 seconds, and during this time, the mold was vibrated by the motors, each set to a speed of 3000 RPM. The mold was then released, yielding 32 preform bricks. The resultant preform bricks were of an orange matrix with gray flashings, throughout the entire body of the brick. This process of filling the mold was repeated for twelve cycles, resulting in 384 bricks.

The preform bricks were then placed into a steam kiln. In this steam kiln, the preform bricks underwent a first cure in steam, at 135 degrees Fahrenheit for two hours, and a second cure in steam at 145 degrees Fahrenheit for four hours. The now formed or resultant bricks were removed from the steam kiln.

The coloration of the bricks remained identical to that of the preform bricks, as detailed immediately above.

There have been shown and described preferred embodiments of bricks and methods for their manufacture. It is apparent to those skilled in the art, however, that many changes, variations, modifications, and other uses and applications for the bricks and methods for their manufacture are possible, and also such changes, variations, modifications, and other uses and applications which do not depart from the spirit and scope of the invention are deemed to be covered by the invention, which is limited only by the claims which follow.

What is claimed is:

1. A method for making at least one concrete brick having a matrix of a first color with flashings of a second color within the matrix, comprising:
    providing a brick machine including a funnel shaped hopper in operable communication with a vibrating mechanism for vibrating the hopper, the hopper releasing to a feeder drawer of a mold;
    mixing a first batch of concrete of a first color in a mixer;
    after the mixing of the first batch of concrete, transferring the first batch of concrete of the first color from the mixer to the hopper by a conveyor between the mixer and the hopper, and the hopper receiving the first batch of concrete from the mixer;
    after the transferring of the first batch of concrete to the hopper, mixing a second batch of concrete of a second color in the mixer, wherein the first color is different than the second color;
    transferring the second batch of concrete of the second color from the mixer to the hopper by the conveyor between the mixer and the hopper, and the hopper receiving the second batch of concrete from the mixer after the receiving of the first batch of concrete from the mixer into the hopper, wherein the second batch of concrete is transferred into the hopper and placed in contact with the first batch of concrete in the hopper;
    continuously vibrating the hopper with the vibrating mechanism and causing the first batch and the second batch to collapse inwardly into a central void with a downwardly moving vortex as the first and second batches flow through the hopper by gravity and mixing the first and second batches via the continuous vibration to form a mixture having the matrix of the first color with the flashings of the second color interspersed throughout the mixture, and where the concretes of the first and second batches remain physically and chemically distinct;
    directing at least a portion of the mixture from the hopper to the feeder drawer and then to the mold while continuously vibrating the hopper; and
    molding the portion of the mixture from the hopper into at least one concrete brick with the flashings throughout the entire brick.

2. The method of claim 1, wherein the transferring the second batch of concrete to the hopper includes placing the second batch of concrete on top of and in contact with the first batch of concrete in the hopper, and the continuous vibration includes continuously vibrating the hopper at least at approximately 1500 revolutions per minute.

3. The method of claim 1, wherein the molding includes:
    providing the mold to receive the portion of the mixture from the hopper;
    filling the mold with the portion of the mixture from the hopper, wherein the mixture passes through an unobstructed bottom opening of the hopper; and,
    applying pressure to the mold to compress the material therein.

4. The method of claim 3, wherein the filling the mold includes:
    filling the feeder drawer with at least a portion of the mixture from the hopper; and,
    moving the portion of the mixture from the feeder drawer to the mold.

5. The method of claim 3, wherein the mold is vibrated.

6. The method of claim 5, wherein the mold is vibrated contemporaneous with or simultaneously with the applying pressure to the mold.

7. The method of claim 1, wherein the funnel shaped hopper includes:
- a first opening for receiving material and a second opening through which material exits the hopper;
- at least a portion of the hopper tapered inward from the first opening to the second opening; and,
- the second opening being narrower than the first opening, the second opening comprising a door.

8. The method of claim 1, additionally comprising:
- steam curing the at least one brick, to form the at least one brick.

9. The method of claim 8, wherein the steam curing includes a first steam curing at approximately 135° F.

10. The method of claim 9, wherein the steam curing includes a second steam curing at approximately 145° F.

11. The method of claim 1, wherein the color of the first concrete batch is the color of the matrix for the at least one brick and the color of the second concrete batch is the color for the flashings for the at least one brick, wherein the vibrating is sufficient to mix the first concrete batch and the second concrete batch such that the first concrete batch and the second concrete batch intersperse throughout the mixture.

12. The method of claim 1, wherein the first concrete batch is formed by mixing components comprising: water, sand, cement, and pigment or by mixing components comprising: water, sand, and cement.

13. The method of claim 12, wherein the second concrete batch is formed by mixing components comprising: water, sand, cement, and pigment or by mixing components comprising: water, sand, and cement.

14. A method for making at least one concrete brick having a matrix with flashings within the matrix, comprising:
- providing a brick machine including a funnel shaped hopper having a first opening through which material is received and a second opening through which material exits from the hopper, the hopper in operable communication with a vibrating mechanism, the hopper releasing to a feeder drawer of a mold;
- mixing a first batch of concrete of a first color in a mixer;
- transferring the first batch of concrete of the first color from the mixer to the hopper by a conveyor between the mixer and the hopper, and the hopper receiving the first batch of concrete from the mixer;
- after the transferring of the first batch of concrete to the hopper, mixing a second batch of concrete of a second color in the mixer, wherein the first color is different than the second color;
- transferring the second batch of concrete of the second color from the mixer to the hopper by the conveyor between the mixer and the hopper, and the hopper receiving the second batch of concrete from the mixer after the receiving of the first batch of concrete from the mixer into the hopper; wherein the second batch of concrete is transferred to the hopper and placed on top of and in contact with the first batch in the hopper;
- forming a mixture of the first batch and the second batch by causing the first batch and the second batch to collapse inwardly into a central void with a downwardly moving vortex upon flowing through the hopper, and continuously vibrating the hopper at a speed of at least approximately 1500 revolutions per minute with the vibrating mechanism and mixing the first and second batches via the continuous vibration as the first and second batches flow through the hopper;
- interspersing the flashings of the second color of the second batch throughout the matrix of the first color of the first batch by the vibrating;
- directing at least a portion of the mixture from the hopper to the feeder drawer and then to the mold while continuously vibrating the hopper; and
- molding the portion of the mixture into at least one concrete brick with the flashings throughout the entire brick.

15. The method of claim 14, wherein the funnel shaped hopper includes:
- at least a portion of the hopper tapered inward from the first opening to the second opening; and,
- the second opening being narrower than the first opening.

16. The method of claim 15, wherein the causing the first batch and the second batch to collapse inwardly into a central void includes opening the second opening.

17. The method of claim 14, wherein the molding includes:
- providing the mold to receive the portion of the mixture from the hopper;
- filling the mold with the portion of the mixture from the hopper; and,
- applying pressure to the mold to compress the material therein.

18. The method of claim 17, wherein the filling the mold includes:
- filling the feeder drawer with the portion of the mixture from the hopper; and,
- moving the portion of the mixture from the feeder drawer to the mold.

19. The method of claim 17, wherein the mold is vibrated.

20. The method of claim 19, wherein the mold is vibrated contemporaneous with or simultaneously with the applying pressure to the mold.

21. The method of claim 14, additionally comprising:
- steam curing the at least one brick, to form the at least one brick.

22. The method of claim 21, wherein the steam curing includes a first steam curing at approximately 135° F.

23. The method of claim 22, wherein the steam curing includes a second steam curing at approximately 145° F.

24. The method of claim 14, wherein the color of the first concrete batch is the color of the matrix for the at least one brick and the color of the second concrete batch is the color for the flashings for the at least one brick.

25. The method of claim 14, wherein the first concrete batch is formed by mixing components comprising: water, sand, cement, and pigment or by mixing components comprising: water, sand, and cement.

26. The method of claim 25, wherein the second concrete batch is formed by mixing components comprising: water, sand, cement, and pigment or by mixing components comprising: water, sand, and cement.

27. A method for making at least one concrete brick having a matrix of a first color with flashings of a second color within the matrix, comprising:
- providing a brick machine including a funnel shaped hopper in operable communication with a vibrating mechanism for vibrating the hopper, the hopper releasing to a feeder drawer of a mold;
- mixing a first batch of concrete of a first color in a mixer;
- after the mixing of the first batch of concrete, transferring the first batch of concrete of the first color from the mixer to the hopper and the hopper receiving the first batch of concrete from the mixer, wherein the first batch of concrete is conveyed to the hopper;

after the transferring of the first batch of concrete to the hopper, mixing a second batch of concrete of a second color in the mixer, wherein the first color is different than the second color;

transferring the second batch of concrete of the second color from the mixer to the hopper, and the hopper receiving the second batch of concrete from the mixer after the receiving of the first batch of concrete from the mixer into the hopper, wherein the second batch of concrete is conveyed to the hopper and placed in contact with the first batch of concrete in the hopper;

vibrating the hopper with the vibrating mechanism at a speed of at least approximately 1500 revolutions per minute and causing the first batch and the second batch to collapse inwardly into a central void with a downwardly moving vortex as the first and second batches flow through the hopper by gravity and mixing the first and second batches via the vibration to form a mixture where the concretes of the first and second batches remain physically and chemically distinct;

interspersing the flashings of the second color of the second batch throughout the matrix of the first color of the first batch by the vibrating;

directing at least a portion of the mixture from the hopper to the feeder drawer and then to the mold while vibrating the hopper; and molding the portion of the mixture from the hopper and stamping the mixture at a pressure of approximately 20,000 pounds per square inch to approximately 50,000 pounds per square inch into at least one concrete brick with the flashings throughout the entire brick.

* * * * *